United States Patent Office 3,303,163
Patented Feb. 7, 1967

3,303,163
ROOM TEMPERATURE VULCANIZING
SILICONE COMPOSITIONS
John C. Goossens, Scotia, N.Y., assignor to General Electric Company, a corporation of New York
No Drawing. Filed Dec. 20, 1963, Ser. No. 332,271
8 Claims. (Cl. 260—46.5)

This invention relates to room temperature vulcanizing or room temperature curing silicne rubber. More particularly, this invention relates to room temperature vulcanizing silicone rubber which has improved cure characteristics in thick sections.

Room temperature vulcanizing silicone rubbers are known in the art and one very useful type of material is that described in Patent 2,843,555, Berridge. The material described in the aforementioned Berridge patent comprises a silanol chain-stopped polydiorganosiloxane fluid, a cross-linking agent such as the partial hydrolysis product of an ethyl orthosilicate, and a curing catalyst such as tin octoate or dibutyl tin dilaurate. While extremely useful product can be purepared following the teachings of the aforementioned Berridge patent, it is sometimes found that such products are difficult to cure in thick sections. For example, when a composition within the scope of the Berridge patent is poured into a container to a depth of about ¾ inch and the container is maintained for 24 hours at 25° C., it is often found that the top of the material cures satisfactorily to a silicone rubber while the material adjacent the surface of the cup at the greatest depth below the surface of the composition shows almost no cure.

It is an object of the present invention to provide an improved room temperature vulcanizing silicone rubber composition with improved deep section cure characteristics. It is a further object of the present invention to provide a method for preparing an improved room temperature vulcanizing silicone rubber composition of improved deep section curing characteristics.

These and other objects of my invention are based on my discovery of a room temperature vulcanizable silicone elastomer composition comprising (1) a silanol chain-stopped polydiorganosiloxane fluid, (2) an organotrichlorosilane and (3) an amine stabilizer having an ionization constant of from about $10^{-12}$ to $10^{-5}$ at 25° C. This composition is cured by adding thereto an amide and thereafter allowing the reaction mixture to cure to a silicone rubber.

The liquid silanol chain-stopped polydiorganosiloxanes which are employed in the practice of the present invention have the formula:

(1)  $HO[(R)_2SiO]_nH$ where R is a member selected from the class consisting of monovalent hydrocarbon radicals, halogenated monovalent hydrocarbon radicals and cyanoalkyl radicals and $n$ has a value of at least 10, e.g., from about 10 to 10,000 or more. Illustrative of the radicals represented by R in Formula 1 are alkyl radicals, e.g., methyl, ethyl, propyl, butyl, actyl, octadecyl, etc., radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated monovalent hydrocarbon radicals, e.g., chloromethyl, chlorophenyl, trifluoromethylpropyl, dibromophenyl, bromohexyl, bromocyclohexyl, etc. radicals; cyanoalkyl radicals, e.g., cyanomethyl, beta-cyanoethyl, beta-cyanopropyl, gamma - cyanopropyl, omega - cyanobutyl, etc. radicals. Preferably, the radicals represented by R in Formula 1 are methyl or phenyl radicals, with the preferred specific radical being methyl. It should be understood that the liquid silanol chain-stopped polydiorganosiloxane of Formula 1 contain more than one type of R group. For example, some of the R groups can be methyl and others can be phenyl and/or beta-cyanoethyl. In any event, it is preferred that in any of the silanol chain-stopped polydiorganosiloxanes employed in the practice of the present invention, at least 50% of the R groups be methyl groups.

Among the many liquid silanol chain-stopped polydiorganosiloxanes within the scope of Formula 1 are included copolymers containing more than one type of diorganosiloxane unit. For example, included within such materials are copolymers of dimethylsiloxane units and methylphenylsiloxane units, as well as copolymers of dimethylsiloxane units, diphenylsiloxane units and methylvinylsiloxane units. Likewise, it is possible that a mixture of silanol chain-stopped polydiorganosiloxanes within the scope of Formula 1 can be employed. While these materials within the scope of Formula 1 have been described as polydiorganosiloxanes, it should be understood that such materials can contain minor amounts, e.g., up to about 1% of monoorganosiloxane units or triorganosiloxane units.

The liquid silanol chain-stopped polydiorganosiloxanes employed in the practice of the present invention can vary from thin fluids up to viscous gums, depending upon the value of $n$ of Formula 1 and the nature of the particular R group attached to the silicon atom. Preferably, however, the silanol chain-stopped polydiorganosiloxane is selected to have a viscosity in the range of from about 100 centipoises to 50,000 centipoises when measured at 25° C.

The amines employed in the practice of the present invention have an ionization constant of from about $10^{-12}$ to $10^{-5}$ at 25° C., with the preferred amines having ionization constants in the range of from $10^{-11}$ to $10^{-7}$. Any of the known amines having such ionization constant appear operative in the present invention. Because of the wide variety of types of amines which can be employed in the practice of the present invention, it is impossible to give a simple structural definition of such amines. Operative amines include primary, secondary and tertiary amines, as well as carbocyclic and acyclic amines. Included also are amines having only carbon, hydrogen and nitrogen atoms, as well as amines having other atoms, such as chlorine or oxygen in the molecule. Likewise, operative amines include those containing only nitrogen and hydrogen, such as hydrazine, or those containing nitrogen, hydrogen and oxygen, such as hydroxyl amine. However, the preferred class of amines employed in the practice of the present invention are those which have ionization constants at 25° C. of from $10^{-11}$ to $10^{-7}$ and which are composed of carbon, hydrogen and nitrogen. Illustrative of the specific amines which can be employed in the practice of the present invention are, for example, aniline, N-methylaniline, N,N-dimethylaniline, o-chloroaniline, benzidine, o-phenylenediamine, p-phenylenediamine, o-toluidine, m-toluidine, and p-toluidine, phenylhydrazine, pyridine, alpha-naphthylamine, beta-naphthylamine, dimethylbenzylamine, alpha-picoline, beta-picoline, gamma-picoline, the isomeric dimethyl pyridines, the isomeric trimethyl pyridines, 2,3,4,5-tetramethyl pyridine, and the quinolines, as well as alkyl-substituted quinolines in which the alkyl substituents are present in either the benzene portion or the pyridine portion of the quinoline structure.

The organotrichlorosilanes employed in the practice of the present invention have the formula:

(2)  $RSiCl_3$ where R is as previously defined. The preferred organotrichlorosilanes employed in the practice of the present invention are methyltrichlorosilane and phenyltrichlorosilane with methyltrichlorosilane being the preferred specific organotrichlorosilane within the scope of Formula 2.

The amides employed in the practice of the present invention have the formula:

where R' and R" are members selected from the class consisting of hydrogen, monovalent hydrocarbon radicals, halogenated monovalent hydrocarbon radicals and cyanoalkyl radicals, R'" is an alkyl radical and further members where R" and R'" taken together represent a divalent alkylene radical. The monovalent hydrocarbon radicals, halogenated monovalent hydrocarbon radicals and cyanoalkyl radicals represented by R' and R" are the same as those previously discussed for R of Formula 1.

As is evidenced from the description of the amides of Formula 3, within the scope of operative amides are many types of materials. The only limitation on the type of the amide is that the nitrogen atom contain some type of saturated aliphatic substituent, which substituent can be either an alkyl radical, preferably a lower alkyl radical containing from 1 to 8 carbon atoms, or the alkyl substituent can be present as a portion of a divalent alkylene radical, such as a divalent polymethylene radical. For example, divalent alkylene radicals formed from the combination of R" and R'" are present in amides derived from piperidine or ring-substituted piperidines. Illustrative of specific amides within the scope of Formula 3 are, for example, N-methylformamide, N,N-dimethylformamide, N-methylacetamide, N,N-dimethylacetamide, N,N-dibutylformamide, N-methyl-N-octylformamide, N-octylformamide, N-methyl-n-valeramide, N-ethylcaprylamide, N,N-pentamethylene-2,4-dichlorobenzamide, etc. The preferred specific amide within the scope of Formula 3 is N,N-dimethylformamide.

As previously mentioned, the room temperature vulcanizable compositions of the present invention are prepared by mixing the silanol chain-stopped polydiorganosiloxane of Formula 1, the amine stabilizer and the organotrichlorosilane of Formula 2. While the exact chemical relationship of the various elements comprising the room temperature vulcanizing compositions of the present invention are not understood with certainty, it is known that if the organotrichlorosilane of Formula 2 is added to the silanol chain-stopped polydiorganosiloxane of Formula 1 and the resulting mixture is exposed to moisture, the resulting material cures to a silicone rubber at room temperature. On the other hand, if the organotrichlorosilane of Formula 2 is added to a mixture of the silanol chain-stopped polydiorganosiloxane of Formula 1 and the amine stabilizer, the resulting composition is completely stable and exhibits no tendency to cure upon exposure to moisture. Accordingly, in the preferred method of preparing the compositions of the present invention, the amine stabilizer is first added to the silanol chain-stopped polydiorganosiloxane and the organotrichlorosilane is thereafter added. With the formulation of the room temperature vulcanizable composition by this procedure, no special precautions need be taken to prevent premature curing of the composition to the solid, cured, elastic state. The only necessary precautions are the ordinary precautions which should be taken with respect to the organotrichlorosilane which has a tendency to hydrolyze upon exposure to atmospheric moisture.

The proportions of the components in the room temperature vulcanizable composition of the present invention can vary within wide limits. Thus, the amine can be employed in an amount equal to from about 0.1 to 0.5 part and preferably from 0.15 to 0.3 part by weight per 100 parts by weight of the silanol chain-stopped polydiorganosiloxane of Formula 1. In addition to employing a single amine, it is also contemplated that a mixture of amines, each of which has an ionization constant of from about $10^{-12}$ to $10^{-5}$, can be employed in the practice of the present invention. When the amine is employed in an amount less than about 0.1 part per 100 parts of siloxane, the shelf life of the compositions begins to decrease. The use of more than about 0.5 part of amine results in no particular benefit.

The amount of organotrichlorosilane within the scope of Formula 2 which is employed in preparing the compositions of the present invention generally varies from about 1.0 to 5.0 parts and preferably from about 1.5 to 3.0 parts per 100 parts of the silanol chain-stopped polydimethylsiloxane. The use of more than about 5.0 parts of the organotrichlorosilane prolongs the time required to cure the products of the present invention and actually causes an over-cured product. The use of less than about 1.0 part also prolongs the time required for cure and results in an under-cured product.

One of the particular benefits of the compositions of the present invention is that the composition comprising the silanol chain-stopped polydiorganosiloxane, the amine stabilizer and the organotrichlorosilane is a liquid at room temperature and therefore can be easily poured into the desired shape and cured without solvent evaporation. However, for some applications, it may be desirable to employ solvents and/or fillers. Where solvents are employed with the curable compositions of the present invention, the solvents can be present in any desired amount, for example, from 10 to 1,000 parts solvent per 1,000 parts of the silanol chain-stopped polydimethylsiloxane with the particular solvent employed being immaterial so long as the solvent serves as an actual solvent for the components of the reaction mixture and is inert to the reactants. Illustrative of the solvents which can be employed are benzene and toluene. Where a solvent is employed, the solvent can be added at any stage during the preparation of the curable composition. For example, the silanol chain-stopped polydiorganosiloxane of Formula 1 and the solvent can be mixed together and thereafter the amine stabilizer and the organotrichlorosilane are added.

It is sometimes desirable to modify the compositions of the present invention by the incorporation of various fillers or extenders to change various properties such as color or cost. Illustrative of the many fillers which can be employed in the compositions of the present invention are titanium dioxide, lithopone, zinc oxide, zirconium silicate, silica aerogel, iron oxide, diatomaceous earth, fumed silica, precipitated silica, glass fibers, chromic oxide, zirconium oxide, aluminum oxide, crushed quartz, calcined clays, asbestos, carbon and graphite, as well as other organic materials such as cotton, cork, synthetic fibers, polyethylene, polyvinyl chloride, etc.

Where fillers are added to the curable compositions of the present invention, they are generally employed in the amounts of from about 20 to 200 parts filler per 100 parts of the liquid silanol chain-stopped polydiorganosiloxane of Formula 1. The fillers can be added at any stage in the preparation of the curable composition. For example, after the amine and the organotrichlorosilane are added to the silanol chain-stopped polydiorganosiloxane, the filler can be added. The presence of the filler in the compositions of the present invention has no significant effect on the curing characteristics of such composition.

The curable compositions of the present invention can also be modified by the incorporation therein of a minor amount of a carboxylic acid salt of a metal ranging from lead to manganese, inclusive, in the electromotive series of metals. The presence of such carboxylic acid salt sometimes tends to improve the uniformity of cure of the cured products resulting from the curable compositions of the present invention. Where such carboxylic acid salt is employed, it is useful in the range of from about 0.01 to 0.1 part by weight per 100 parts of the silanol chain-stopped polydimethylsiloxane of Formula 1. Illustrative of the metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bistrichlorobenzoate, diphenyl lead diformate, dibutyl tin dilactate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, tris-phenyl lead cyclohexenyl acetate, triphenyl lead ethylmalonate, etc.

To cure the curable compositions of the present invention, the amide of Formula 3 is simply mixed into the curable composition and the composition thereafter cures to the solid, elastic state. The amide of Formula 3 can be employed either with or without a solvent for addition to the curable composition. In general, where a solvent is employed, its function is simply to facilitate the dispersion of the amide into the curable composition and takes no part in the curing reaction. However, in the preferred embodiment of my invention, no solvent is employed so that no problem of removing solvent during curing occurs. The amount of solvent employed is generally from about 0.5 to 5.0 parts per part of the amide of Formula 3. Suitable solvents include acetone, methylethyl ketone, benzene, toluene, etc.

Whether or not a solvent is employed, the amide of Formula 3 is employed in the amount of from about 0.5 to 3.0 and preferably from 1.0 to 2.0 parts by weight per 100 parts of the silanol chain-stopped polydimethylsiloxane of Formula 1. With more than about 3 parts of the amide, the compositions cure too rapidly, e.g., in minutes, while with less than 0.5 part, an excessive time is required for complete cure.

While the precise chemical mechanism involved in the curing of the present invention is not fully understood, it is known that the curing of the curable compositions of the present invention with the amide of Formula 3 is not dependent upon the amount of water present in the curing environment. Thus, the curable compositions of the present invention can be cured with the amide of Formula 3 in either a dry or moist environment. Likewise, the properties of the cured product are independent of the thickness of the composition being cured, with no upper limit having been found on the thickness of room temperature curable silicone rubber which could be prepared and cured by the process of the present invention. The room temperature curing compositions and the cure technique of the present invention can be employed in the same manner as other room temperature vulcanizing silicone rubber compositions. Thus, the curable composition can be mixed with the amide and the resulting mixture can be used in many sealing, caulking and coating applications by merely placing the composition in the desired place and permitting the composition to cure.

The time required for cure varies with the particular reactants and the particular amount of amide employed as a curing agent. However, in general, the compositions cure completely to the rubbery state within about 24 hours at room temperature.

The following examples are illustrative of the practice of my invention and are not intended for purposes of limitation. All parts are by weight.

*Example 1*

In this example, a number of room temperature curable compositions within the scope of the present invention were prepared from 100 parts of silanol chain-stopped polydimethylsiloxane having a viscosity of about 3,000 centipoises at 25° C. and containing 0.3 weight percent silicon-bonded hydroxyl groups. To this polydimethylsiloxane were added various amounts of pyridine and then various amounts of methyltrichlorosilane to produce the curable composition. Portions of each of the curable compositions were allowed to stand for at least 48 hours at room temperature and were examined for any change. No changes in appearance were evident. Subsequently, varying amounts of dimethylformamide were added to each of the compositions and the resulting reaction mixtures were observed. In Table I below are listed the parts of pyridine, methyltrichlorosilane and dimethylformamide employed in preparing the compositions.

TABLE I

| Run No. | 1 | 2 | 3 | 4 | 5 | 6 | 7 | 8 | 9 | 10 | 11 | 12 |
|---|---|---|---|---|---|---|---|---|---|---|---|---|
| Pyridine | 0.3 | 0.3 | 0.3 | 0.3 | 0.3 | 0.1 | 0.15 | 0.5 | 0.3 | 0.3 | 0.3 | 0.3 |
| Methyltrichlorosilane | 2.0 | 2.0 | 2.0 | 2.0 | 2.0 | 2.0 | 2.0 | 2.0 | 1.2 | 1.5 | 3.0 | 5.0 |
| Dimethylformamide | 0.5 | 1.0 | 1.5 | 2.0 | 3.0 | 1.5 | 1.5 | 1.5 | 1.5 | 1.5 | 1.5 | 1.5 |

Except for Run No. 1, each of the compositions described in the above table had cured in 24 hours at room temperature to a tough, flexible silicone rubber. The material of Run No. 1 took 36 hours to cure.

*Example 2*

Following the procedure of Example 1, a mixture was prepared of 100 parts of the silanol chain-stopped polydimethylsiloxane of Example 1, 0.3 part pyridine and 2.0 parts methyltrichlorosilane. To one portion of this material was immediately added sufficient dimethylformamide to provide 1.5 part dimethylformamide per 100 parts of the polydimethylsiloxane. A first portion of the resulting mixture was added to a first aluminum cup to a depth of 1.5 inch and a second portion was added to another aluminum cup to the same depth. One of these cups was maintained in a desiccator at atmospheric temperature and pressure, while the other was exposed to the atmosphere. Within 24 hours, the material in both of the cups had uniformly cured to a tough silicone rubber. Another portion of the material prepared from the polydimethylsiloxane, pyridine and methyltrichlorosilane was kept in a closed container for 60 days while a further portion of such material was kept in an open container for the same period of time. At the end of this period of time, 1.5 part dimethylformamide per 100 parts of the polydimethylsiloxane was added to each of such containers and within 24 hours thereafter, the materials in the containers had been converted to a tough, flexible silicone rubber.

*Example 3*

In this example, four different compositions were prepared from 100 parts of the silanol chain-stopped polydimethylsiloxane of Example 1, 2.0 parts methyltrichlorosilane and 0.3 part of various amines. The four amines employed were isoquinoline, aniline, N,N-dimethylaniline, and collidine. After storage in open containers at room temperature for 48 hours, no change had been observed in any of the four compositions. Thereafter, 1.5 parts of dimethylformamide was added to each of the compositions and within 24 hours each of the compositions had cured to the solid silicone rubber state.

*Example 4*

Two room temperature curable compositions were prepared from 100 parts of polydimethylsiloxane of Example 1, 0.3 part pyridine and, respectively, 1.5 part and 3.0 parts phenyltrichlorosilane. Both of the resulting compositions were stable upon exposure to the atmosphere. When 1.5 part of dimethylformamide was added to each of the compositions, the resulting product cured to the solid, elastic state within 24 hours.

*Example 5*

This example illustrates the use of different amides to cure the curable compositions of the present invention. A curable composition was prepared from 100 parts of the polydimethylsiloxane of Example 1, 0.3 part pyridine and 2.0 parts methyltrichlorosilane. To portions of the resulting curable composition was added, in an amount sufficient to provide 1.5 part of the amide per part of the polydimethylsiloxane, the following amides: N-n-butylacetanilide, N,N-dimethylacetamide, N-methylacetamide, and N,N-pentamethylene-2,4-dichlorobenzamide (the amide from piperidine and 2,4-dichlorobenzoic acid). Each of the resulting compositions cured to the solid, elastic silicone rubber state within 24 hours at room temperature.

*Example 6*

A curable composition is prepared by mixing 0.3 part isoquinoline and 2.0 parts ethyltrichlorosilane into 100 parts of a silanol chain-stopped copolymer containing 3 mole percent diphenylsiloxane units and 97 mole percent dimethylsiloxane units, which copolymer has a viscosity of 20,000 centipoises at 25° C. and contains 0.05 percent by weight silicon-bonded hydroxyl groups. To this curable mixture is added 1.5 part of N,N-dimethylacetamide and at the end of 24 hours, the resulting mixture cures at room temperature to a solid, elastic silicone rubber.

*Example 7*

A curable composition is prepared by mixing 100 parts of the polydimethylsiloxane fluid of Example 1 with 0.2 part N-methylaniline, 1.0 part methyltrichlorosilane, 1.0 part phenyltrichlorosilane, 0.05 part dibutyl tin dilaurate and 25 parts finely divided carbon black. To the resulting mixture is then added 0.5 part dimethylformamide and the resulting mixture is allowed to stand for 24 hours at room temperature. At the end of this time, the material has cured to a strong, black, elastic silicone rubber.

While the foregoing examples have described many of the embodiments of the present invention, it should be understood that my invention is directed broadly to a class of room temperature curable compositions comprising a silanol chain-stopped polydiorganosiloxane within the scope of Formula 1, an amine stabilizer of the class previously described having an ionization constant of from $10^{-12}$ to $10^{-5}$ at 25° C. and an organotrichlorosilane within the scope of Formula 2. These compositions are cured by admixture with the amides of Formula 3. The various ingredients employed in the practice of the present invention are generally present in the amount of from 0.1 to 0.5 part by weight of the amine, from 1 to 5 parts by weight of the organotrichlorosilane and from 0.5 to 3 parts of the amide per 100 parts of the silanol chain-stopped polydiorganosiloxane.

What I claim as new and desire to secure by Letters Patent of the United States is:

1. A curable composition comprising a liquid silanol chain-stopped polydiorganosiloxane, an amine having an ionization constant of from $10^{-12}$ to $10^{-5}$ at 25° C. and an organotrichlorosilane, where the organo groups of said polydiorganosiloxane and said organotrichlorosilane are members selected from the class consisting of monovalent hydrocarbon radicals, halogenated monovalent hydrocarbon radicals and cyanoalkyl radicals.

2. A room temperature curable composition comprising a liquid silanol chain-stopped polydimethylsiloxane having a viscosity of from 100 to 50,000 centipoise at 25° C., an amine having an ionization constant of from $10^{-12}$ to $10^{-5}$ and an organotrichlorosilane having the formula:

$$RSiCl_3$$

where R is a member selected from the class consisting of monovalent hydrocarbon radicals, halogenated monovalent hydrocarbon radicals and cyanoalkyl radicals.

3. A curable composition comprising, by weight, 100 parts of a silanol chain-stopped polydiorganosiloxane having the formula:

$$HO[(R)_2SiO]_nH$$

from 0.1 to 0.5 part of an amine having an ionization constant of from $10^{-12}$ to $10^{-5}$ at 25° C. and from 1 to 5 parts of an organotrichlorosilane having the formula:

$$RSiCl_3$$

where R is a member selected from the class consisting of monovalent hydrocarbon radicals, halogenated monovalent hydrocarbon radicals and cyanolkyl radicals and $n$ has a value of at least 10.

4. A composition curable to the solid, elastic state comprising, by weight, 100 parts of a liquid silanol chain-stopped polydimethylsiloxane, from 0.1 to 0.5 part of an amine having an ionization constant of from $10^{-12}$ to $10^{-5}$ and from 1.0 to 5.0 parts of methyltrichlorosilane.

5. A composition curable to the solid, elastic state comprising, by weight, 100 parts of a liquid silanol chain-stopped polydimethylsiloxane having a viscosity of from about 100 to 50,000 centipoise when measured at 25° C., from 0.1 to 0.5 part of pyridine and from 1.0 to 5.0 parts methyltrichlorosilane.

6. A cured elastic composition obtained from a mixture of ingredients comprising, by weight, 100 parts of a liquid silanol chain-stopped polydiorganosiloxane having the formula:

$$HO[(R)_2SiO]_nH$$

from 0.1 to 0.5 part of an amine having an ionization constant of $10^{-12}$ to $10^{-5}$, from 1.0 to 5.0 parts of an organotrichlorosilane having the formula:

$$RSiCl_3$$

and from 0.5 to 3.0 parts of an amide having the formula:

$$R'\overset{O}{\underset{\|}{C}}NR''R'''$$

where R is a member selected from the class consisting of monovalent hydrocarbon radicals, halogenated monovalent hydrocarbon radicals and cyanoalkyl radicals, R' and R'' are members selected from the class consisting of hydrogen, monovalent hydrocarbon radicals, halogenated monovalent hydrocarbon radicals and cyanoalkyl radicals, R''' is an alkyl radical and further members where R'' and R''' taken together represent a divalent alkylene radical, and $n$ has a value of at least 10.

7. A process for forming a composition curable to the solid, elastic state which comprises forming a mixture of, by weight, 100 parts of a silanol chain-stopped polydiorganosiloxane having the formula:

$$HO[(R)_2SiO]_nH$$

and from 0.1 to 0.5 part of an amine stabilizer having an ionization constant at 25° C. of from $10^{-12}$ to $10^{-5}$ and thereafter adding to such mixture from 1.0 to 5.0 parts of an organotrichlorosilane having the formula:

$$RSiCl_3$$

where R is a member selected from the class consisting of monovalent hydrocarbon radicals, halogenated monovalent hydrocarbon radicals and cyanoalkyl radicals and $n$ has a value of at least 10.

8. The method of preparing a silicone elastomer which comprises (A) forming a curable composition by adding, by weight, from 0.1 to 0.5 part of an amine having an ionization constant of from $10^{-12}$ to $10^{-5}$ to 100 parts of a silanol chain-stopped polydiorganosiloxane having the formula:

$$HO[(R)_2SiO]_nH$$

and thereafter adding to the resulting mixture from 1 to 5 parts of an organotrichlorosilane having the formula:

$$RSiCl_3$$

and (B) curing such curable composition by adding thereto from 0.5 to 3 parts of an amide having the formula:

$$R'\overset{O}{\underset{\|}{C}}NR''R'''$$

and thereafter allowing the resulting mixture to cure, where R is a member selected from the class consisting of monovalent hydrocarbon radicals, halogenated monovalent hydrocarbon radicals and cyanoalkyl radicals, R' and R'' are members selected from the class consisting of hydrogen, monovalent hydrocarbon radicals, halogenated monovalent hydrocarbon radicals and cyanoalkyl radicals, R''' is an alkyl radical, and further members wherein R'' and R''' taken together form a divalent alkylene radical and $n$ has a value of at least 10.

References Cited by the Examiner

UNITED STATES PATENTS

| | | | |
|---|---|---|---|
| 2,843,555 | 7/1958 | Berridge | 260—37 |
| 3,032,528 | 5/1962 | Nitzsche et al. | 260—37 |
| 3,035,016 | 5/1962 | Brunner | 260—46.5 |
| 3,127,363 | 3/1964 | Nitzsche et al. | 260—37 |
| 3,155,634 | 11/1964 | Pike | 260—448.2 |
| 3,186,967 | 6/1965 | Nitzsche et al. | 260—46.5 |

FOREIGN PATENTS

| | | |
|---|---|---|
| 602,138 | 7/1960 | Canada. |
| 848,311 | 9/1960 | Great Britain. |
| 913,295 | 12/1962 | Great Britain. |
| 981,823 | 1/1965 | Great Britain. |

OTHER REFERENCES

Eaborn: Organosilicon Compounds, Academic Press Inc., New York, page 237, 1960.

DONALD E. CZAJA, *Primary Examiner.*

LEON J. BERCOVITZ, *Examiner.*

M. I. MARQUIS, *Assistant Examiner.*